United States Patent
Fehrle et al.

(10) Patent No.: US 6,923,606 B2
(45) Date of Patent: Aug. 2, 2005

(54) MEDICAL EVACUATION PATIENT SUPPORT PALLET

(75) Inventors: Brett Fehrle, Yukon, OK (US); Nathan Richmond, Moore, OK (US); Thomas Kinsey, Norman, OK (US); Chris Cuellar, Oklahoma City, OK (US)

(73) Assignee: Arinc Incorporated, Annapolis, MD (US)

( * ) Notice: Subject to any disclaimer, the term of this patent is extended or adjusted under 35 U.S.C. 154(b) by 0 days.

(21) Appl. No.: 10/231,348

(22) Filed: Aug. 30, 2002

(65) Prior Publication Data

US 2003/0143052 A1 Jul. 31, 2003

Related U.S. Application Data

(60) Provisional application No. 60/352,268, filed on Jan. 30, 2002.

(51) Int. Cl.[7] .................................................. B61D 3/16
(52) U.S. Cl. ........................................ 410/46; 211/173
(58) Field of Search ............................ 410/46, 104, 84, 410/32, 102, 31; 108/55.1, 55.5, 53.5, 108, 107; 211/193, 207, 184; 244/117 R, 118.1, 119.2, 118.5, 118.6, 137.1, 137.2

(56) References Cited

U.S. PATENT DOCUMENTS

| | | | |
|---|---|---|---|
| 1,263,918 A | * 4/1918 | Miller | |
| 2,303,618 A | * 12/1942 | Couleur | 296/19 |
| 2,605,064 A | * 7/1952 | Davis | |
| 3,005,656 A | * 10/1961 | Fulton | 296/19 |
| 3,090,177 A | * 5/1963 | Budd | |
| 3,358,300 A | * 12/1967 | Smith | |
| 3,512,654 A | * 5/1970 | Olsen et al. | |
| 3,525,442 A | * 8/1970 | Novales | |
| 3,643,603 A | * 2/1972 | King | 105/366 |
| 3,747,777 A | * 7/1973 | Kane | 211/176 |
| 3,966,159 A | * 6/1976 | Brown | 211/134 |
| 4,115,884 A | * 9/1978 | Keogh | 5/625 |
| 4,178,032 A | 12/1979 | Hone | |
| 4,284,013 A | * 8/1981 | Davidson | 108/50 |
| 4,397,432 A | * 8/1983 | Resetar | 211/193 |
| 4,425,978 A | * 1/1984 | Star | 180/243 |
| 4,458,864 A | * 7/1984 | Colombo et al. | 244/118.5 |
| 4,483,499 A | * 11/1984 | Fronk | 244/118.1 |
| 4,783,025 A | * 11/1988 | Moffett | 244/118.5 |
| 4,957,121 A | * 9/1990 | Icenogle et al. | 128/897 |
| 5,101,964 A | * 4/1992 | Westphal | 108/55.5 |
| 5,110,153 A | * 5/1992 | Kallansrude et al. | 180/41 |
| 5,372,339 A | 12/1994 | Morgan | |
| 5,383,629 A | 1/1995 | Morgan | |
| 5,383,630 A | * 1/1995 | Flatten | 244/118.6 |
| 5,660,637 A | * 8/1997 | Dodge | 118/500 |
| 5,827,022 A | 10/1998 | Tovani | |
| 5,938,047 A | * 8/1999 | Ellis et al. | 211/193 |

(Continued)

OTHER PUBLICATIONS

"Pallets", aarcorp.com—Cadillac Manufacturing—Pallets, http://www.aarcorp.com/manufact/pallets/pal_devel.html, pp. 1–2, Mar. 12, 2002.

*Primary Examiner*—H. Gutman
(74) *Attorney, Agent, or Firm*—Oliff & Berridge, PLC

(57) ABSTRACT

The invention provides a reconfigurable patient support pallet system for transporting patients on litters. The patient support pallet system includes a pallet mounted to the floor of a vehicle. The pallet has a plurality of track rails and attachment points for attaching a litter stanchion set, capable of holding a patient in a litter, and/or for attaching a seat to the surface of the pallet. The pallet also includes a plurality of pallet lips and cargo rings on the periphery which provide locations to attach one or more pallet extensions, pallet spacers and/or pallet ramps to increase the usable surface area of a pallet, as well as facilitate safe passage on, off and between pallets by reducing tripping hazards inherent in cargo aircraft.

20 Claims, 16 Drawing Sheets

U.S. PATENT DOCUMENTS

| | | |
|---|---|---|
| 6,152,401 A | 11/2000 | Green |
| 6,219,983 B1 * | 4/2001 | Gr.ang.kjaar Jensen et al. ............ 52/403.1 |
| 6,302,358 B1 | 10/2001 | Emsters et al. |
| 6,349,656 B1 * | 2/2002 | Mitchell ............ 108/53.1 |
| 6,471,456 B2 * | 10/2002 | Wassick ............ 410/46 |
| 6,474,245 B2 * | 11/2002 | Richard ............ 108/55.1 |
| 6,561,739 B1 * | 5/2003 | Garala ............ 410/46 |
| 6,607,083 B1 * | 8/2003 | Webb ............ 108/55.1 |
| 6,622,640 B2 * | 9/2003 | Taylor et al. ............ 108/55.5 |

* cited by examiner

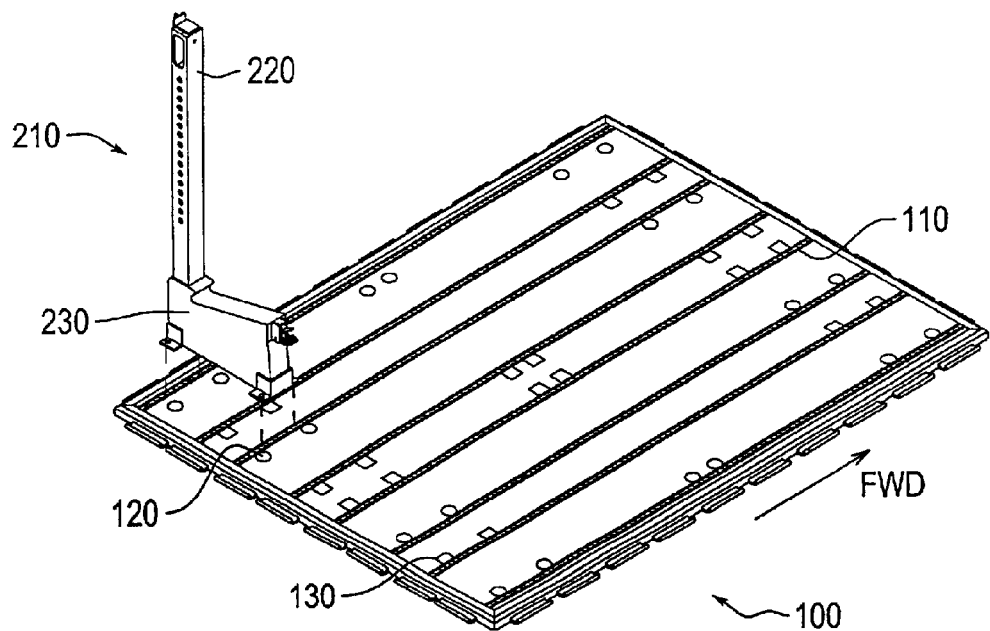
Fig. 2A
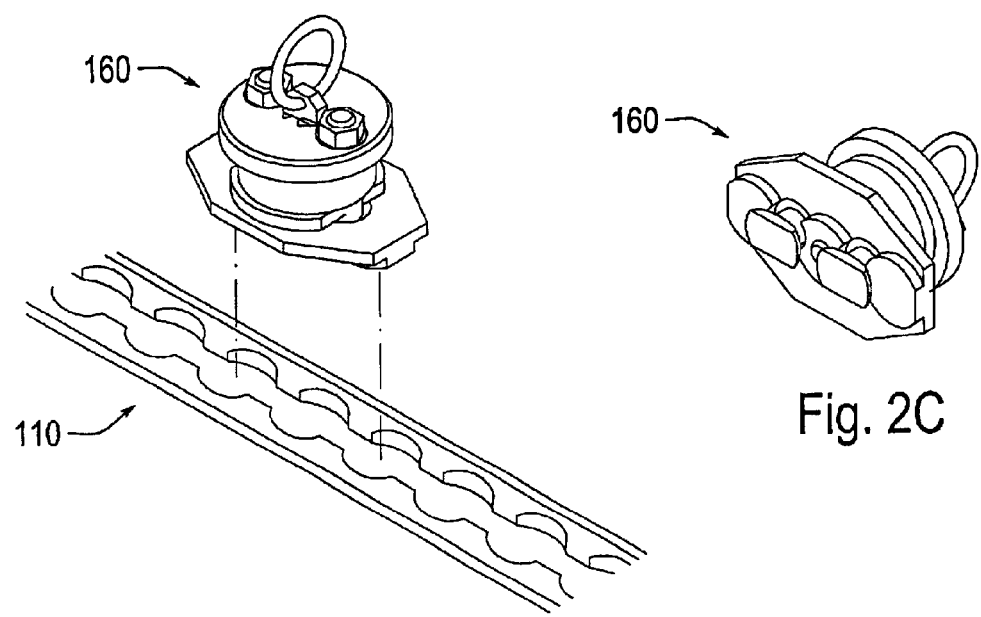
Fig. 2B
Fig. 2C

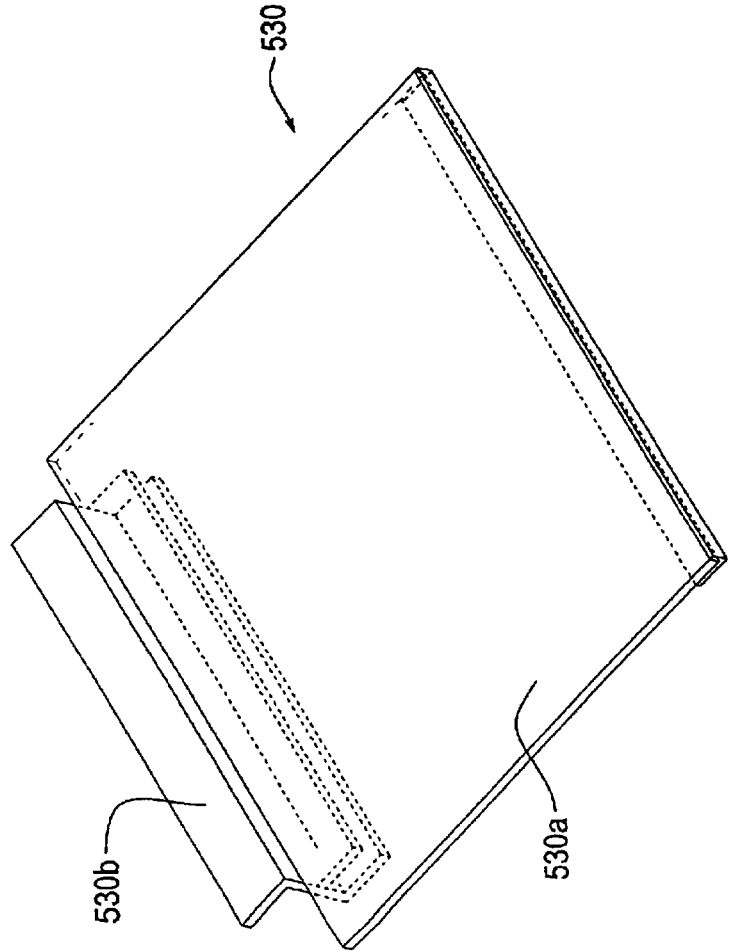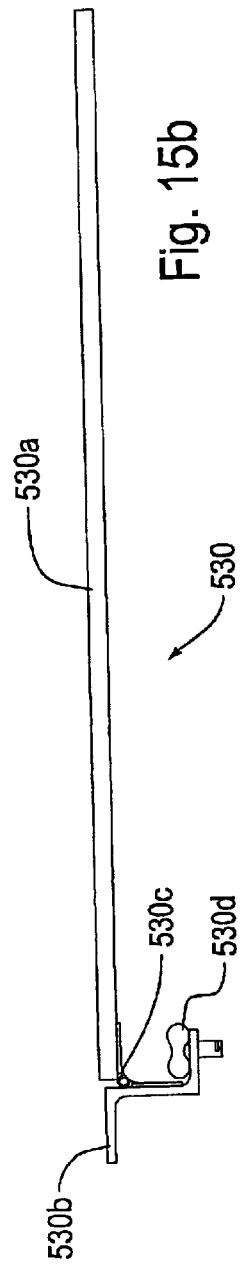

MEDICAL EVACUATION PATIENT SUPPORT PALLET

This application claims the benefit of U.S. Provisional Application No. 60/352,268, filed Jan. 30, 2002.

BACKGROUND OF THE INVENTION

1. Field of Invention

This invention relates generally to the medical and aeromedical evacuation of patients and passengers for intra-theater or inter-theater patient movement. More specifically, this invention relates to a multi-use, reconfigurable pallet system capable of supporting at least one litter stanchion set and/or seats for use with a variety of modes of transportation, including aircraft of opportunity.

2. Description of Related Art

Various methods and systems have been employed to evacuate patients and passengers from one area of responsibility to a major medical treatment facility in another area of responsibility or the movement of patients and passengers within the same area of responsibility. For example, systems incorporating litter stanchions for patient transport have been developed. However, these systems are unsatisfactory because they offer only fixed litter stanchions that may not be reconfigured into a variety of configurations to allow multiple litter stanchions, seats, or a combination of both litter stanchions and seats.

U.S. Pat. No. 4,783,025 to Moffett discloses an apparatus for movably supporting a patient in an emergency medical system within a helicopter. The apparatus includes a movable pallet on which a litter or stretcher can be placed. The pallet may be raised to a bench level, thereby permitting paramedics to work comfortably on a patient while freeing up floor space beneath the pallet for equipment or an additional patient.

U.S. Pat. No. 5,383,629 to Morgan discloses an emergency medical system for movably supporting a plurality of patients in a generally rectangular vehicle (air ambulance such as a helicopter or fixed wing aircraft) interior space. The system comprises three litter rack systems and from one to three attendant seats. Additional attendant seating is positionable in the space adjacent to the litter rack system. The attendant seats are removably secured to the floor of the vehicle, thus providing the system the capability of transporting six litter patients, or a combination of transporting three seated, three litter patients, or six seated passengers.

U.S. Pat. No. 4,178,032 to Hone discloses a patient litter apparatus for use in an air-ambulance, or helicopter, that synchronously elevates and lowers a patient. The apparatus also provides crash attenuation capabilities to protect the patient in the event of a down-crash or other large scale force. The elevating mechanism consists of a pulley system and a hoisting drum to asynchronously elevate or lower the litter to the desired position.

U.S. Pat. No. 5,372,339 to Morgan discloses a multi-tiered litter for access and for use in a helicopter, or fixed wing aircraft. The system consists of a plurality of vertical support members mounted to an interior wall and vertical adjustment means to independently adjust the space in between the litters. The multi-tiered rack system further includes control means which are operatively connected to the vertical adjustment means for controlling the vertical position and tilt of each of the litters. The vertical support members include a vertical drive screw and a motor and worm gear assembly attached to each drive screw to move a litter vertically on the system.

AAR Corporation has a seat and litter pallet project in development that claims to provide a pallet that may be configured for soft seat, tourist, or business class passenger seating or constructed with stanchions for litter patient evacuation. However, mixed use and multiple configurations are not disclosed.

Each of these systems, provides only fixed litter racks that are not removable or collapsible for easy storage and transportation. Further, the related art does not allow for reconfigurable systems wherein the litter stanchions may be quickly and easily reconfigured to fit a variety of different modes of transportation, including aircraft of opportunity, that may be available in a particular theater or area of responsibility.

SUMMARY OF THE INVENTION

In response to the problems of existing patient evacuation systems, and to meet the need for a patient evacuation system for use in a variety of modes of transportation, such as use in multiple air frames, a reconfigurable patient support pallet system has been developed. The patient support pallet system according to the invention provides a mixed use pallet system that supports multiple configurations to include a combination of litter stanchions and/or passenger seats. The patient support pallet system is easily and quickly disassembled for more efficient transportation of the system to desired locations, as well as for convenient storage at forward operating locations until needed. Accordingly, when a particular mode of transportation, such as an aircraft of opportunity, becomes available the patient support pallet system may be retrieved and installed quickly and easily to meet the required medical evacuation needs.

According to an exemplary embodiment of the apparatus and methods of the invention, a patient support pallet system has been developed that may be easily loaded into a variety of transportation modes, or vehicles, such as aircraft, by ramp and or side door. According to the invention, the pallet has a plurality of track rails embedded into the pallet surface to provide quick and reconfigurable mounting of litter stanchion sets and/or airline-type seats. In a preferred embodiment, eight track rails are mounted in a direction parallel to the longitudinal axis of the pallet. The track rails are spaced at intervals to accept both litter stanchions and airline type seats, while keeping patients away from the un-insulated interior walls of the aircraft. The track rails allow for easy reconfiguration of the patient support pallet system and maximum use of the pallet surface area. In additional embodiments, the track spacing may also accommodate the use of other items, such as a table, that may be mounted using the track rails. The pallet surface may be covered with a non-skid material that helps eliminate the occurrence of slippage. The pallet surface may also be easily cleaned and sanitized in the event that body fluids, or other liquids, are spilled. Although airline-type seats are disclosed in this exemplary embodiment, other seats may be used that are attachable to the pallet.

The litter stanchion sets, according to the apparatus and methods of the invention, are designed to support at least three tiers of North Atlantic Treaty Organization (NATO) standard folding litters. The vertical separation between the stanchion arms is adjustable to allow each set of stanchions to receive a plurality of litters. Litter stanchion locking devices allow easy capture of the litter and provide positive locking of the litter to the stanchion. A clamp disposed on each litter stanchion arm allows for easy securing of the litter to the stanchion arms. The litter stanchion arms may also be removed from the stanchion and stored. The litter stanchion can be removed from its base and placed in a horizontal position and secured to the pallet to reduce the volume of the patient support pallet system during transport or storage.

In various exemplary embodiments according to the apparatus and methods of this invention, the airline type seats may be aft or forward facing. Each seat may be equipped with a back rest recline, padded arm rest, in-arm bi-fold tray table, lap safety belt, break-over back rest, and removable cloth upholstery. The seats are disposed on the pallet in a manner that keeps the occupant away from the interior walls of the aircraft and allows safe occupancy by patients, attendants, or passengers. The seat upholstery and cushions may be removed for cleaning, sanitizing, or replacement.

The patient support pallet system according to the apparatus and methods of the invention is reconfigurable. In various exemplary embodiments according to the apparatus and methods of this invention, the patient support pallet system may be configured as a mixed use pallet having aircraft type seats and a litter stanchion set supporting up to three litter tiers (FIG. 4). Another exemplary configuration of the patient support pallet system may include a litter pallet with centerline disposed stanchions supporting up to three tiers of litters on each side of the litter stanchion sets (FIG. 5). Yet another exemplary configuration of the patient support pallet system includes a litter pallet with a litter stanchion set aligned at opposite sides of the pallet, each litter stanchion set capable of supporting up to three tiers of litters (FIG. 6). An additional exemplary configuration of the patient support pallet system includes a pallet having only six aircraft-type seats (FIG. 7). Although exemplary configurations are disclosed, other configurations may be implemented according to the apparatus and method of this invention.

In various exemplary embodiments according to the apparatus and methods of this invention, the patient support pallet system according to the apparatus and methods of the invention further includes a pallet extension, pallet spacer and pallet ramp to increase the usable surface area of a pallet, as well as and facilitate safe passage on, off and between pallets by reducing tripping hazards inherent in cargo aircraft.

These and other features and advantages of this invention are described in, or are apparent from, the following detailed description of various exemplary embodiments of the apparatus and methods according to this invention.

BRIEF DESCRIPTION OF THE DRAWINGS

Various exemplary embodiments of the apparatus and methods according to this invention will be described in detail, with reference to the following figures, wherein:

FIG. 2A shows a single litter stanchion and attachment points on a patient support pallet, according to an exemplary embodiment of the invention;

FIGS. 2B and 2C show an exemplary detachable fastening device that may be used to secure a variety of components to a pallet;

FIG. 15a shows a plan view of a ramp member, according to an exemplary embodiment of the invention;

FIG. 15b shows a cross sectional view of a ramp member, according to an exemplary embodiment of the invention;

DETAILED DESCRIPTION OF PREFERRED EMBODIMENTS

Figure 1A:
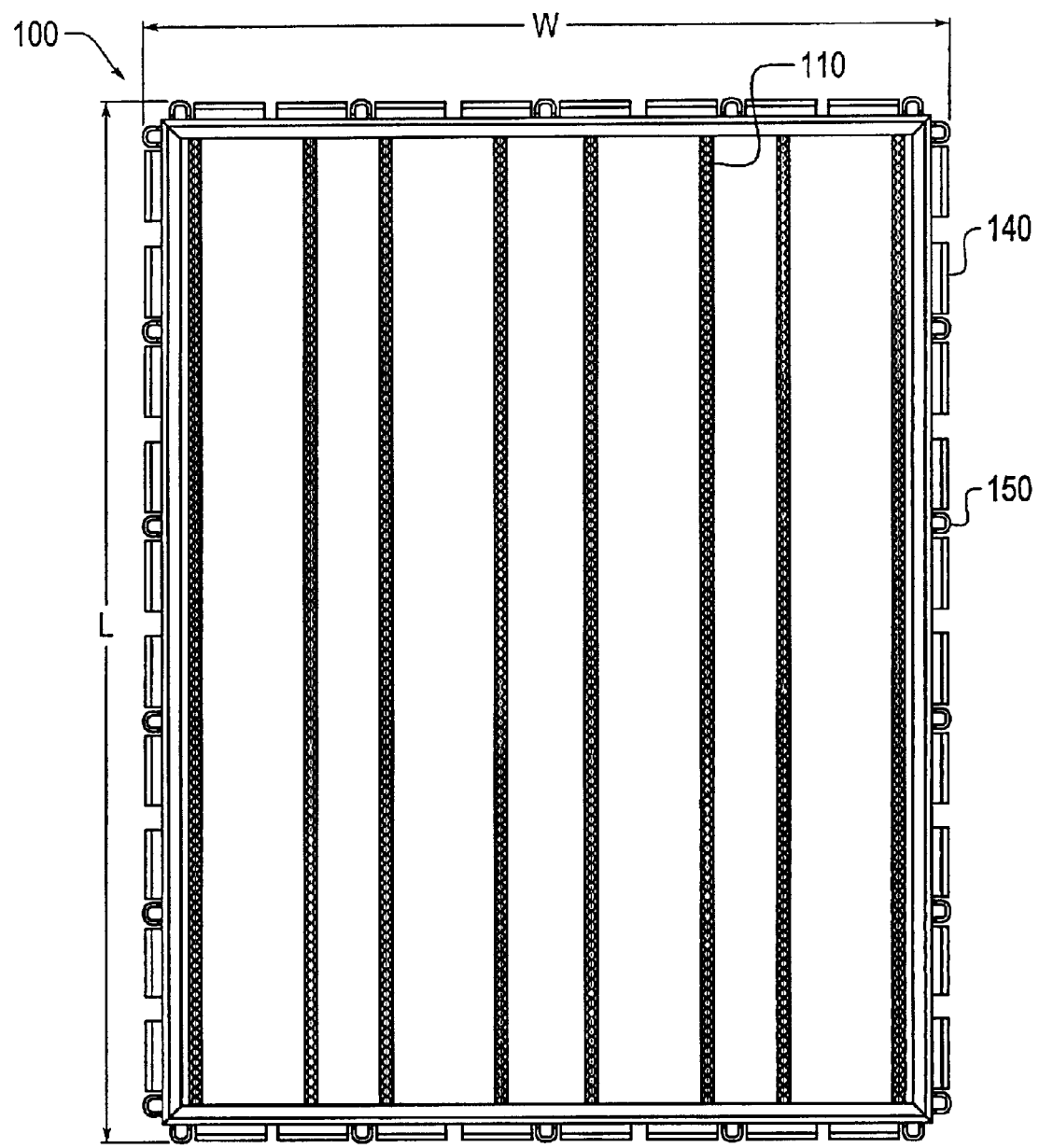
FIGS. 1A and 1B show a patient support pallet, according to an exemplary embodiment of the invention.
Figure 1B:
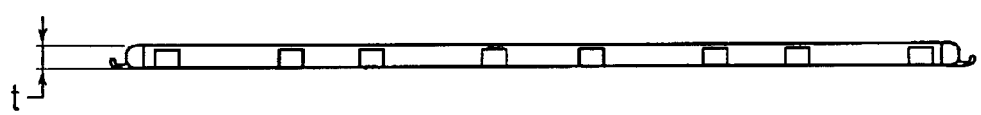
Figure 4:
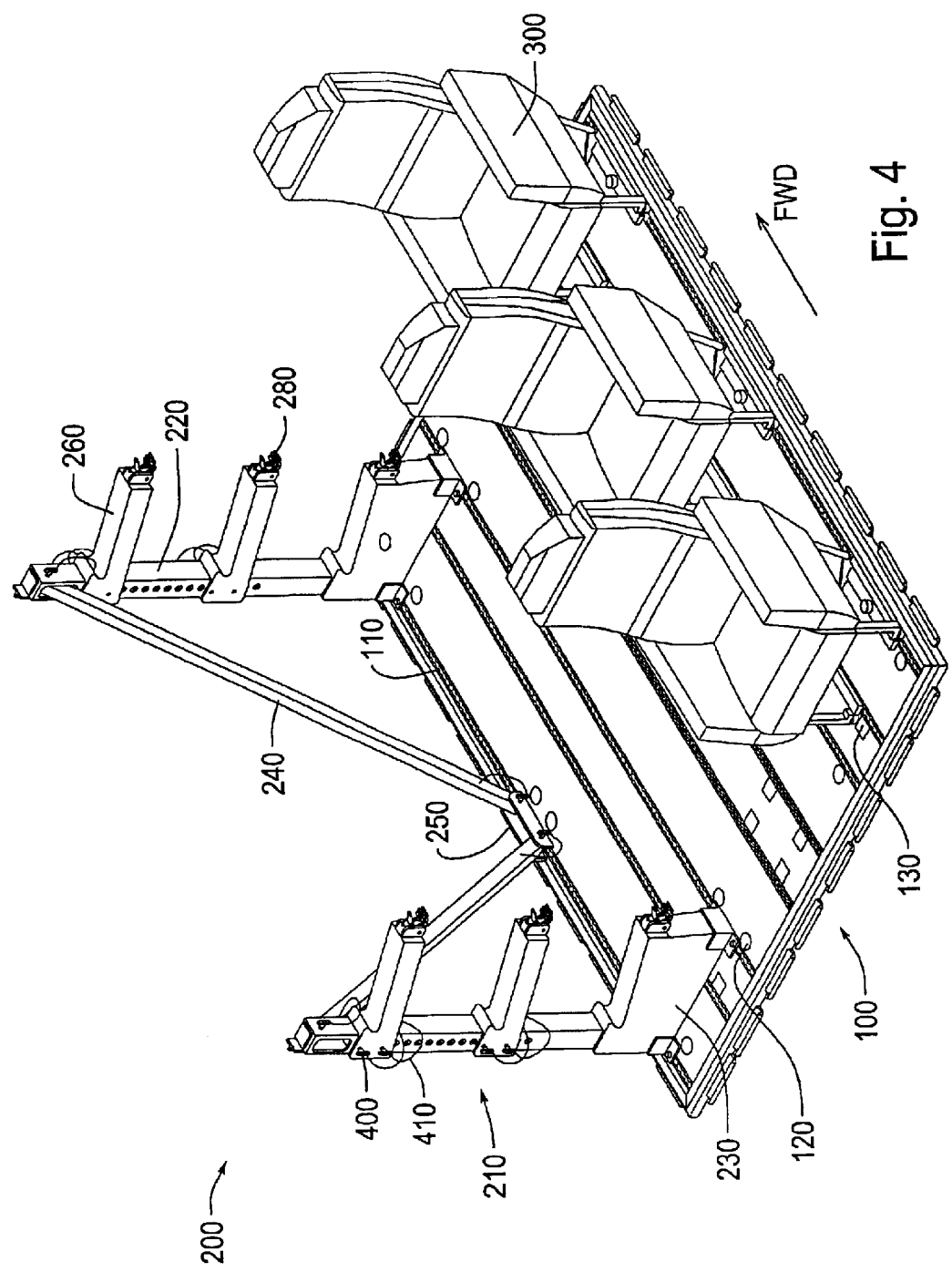
FIG. 4 shows a patient support pallet system for mixed use with aircraft-type seats and a litter stanchion set capable of supporting up to three tiers of litters, according to an exemplary embodiment of the invention.

FIG. 1 shows a pallet 100, according to one exemplary embodiment of the invention, having a length L, a width W, and a thickness t. In an exemplary embodiment of the invention, the length L equals about 108 inches, the width W equals about 88 inches and the thickness t equals about 2.25 inches, for use in a variety of aircraft of opportunity, such as the C-17A, C-130 E/H/J, KC-10A and KC-135. Although one exemplary embodiment is disclosed, it is contemplated that other dimensions for the pallet are included in the apparatus and methods of the present invention. Use of the ramps and spacers, according to the present invention (FIG. 12), also enables the use of the patient support pallet system in additional aircraft of opportunity and other modes of transportation without constructing pallets of different dimensions. The pallet 100 may be made of aluminum or other appropriate material. The pallet 100 has a plurality of pallet lips 140 and cargo rings 150 disposed on the periphery thereof. The pallet 100 has a plurality of track rails 110 that are spaced at intervals to accept a variety of different configurations of litter stanchion sets 200 and/or airline-type seats 300 (FIG. 4). In an exemplary embodiment of the invention, the track rails 110 may be spaced apart, for example, at about 20.75 inch intervals to accommodate litter stanchions and about 12.6 inch intervals to accommodate seats. In a preferred embodiment the seat rails 110 are flush with the surface of the pallet 100. In various exemplary embodiments of the apparatus and methods according to this invention, the surface of the pallet 100 may be covered with a non-slip material, sealed to prevent fluid penetration, and easily cleaned and sanitized. The pallet 100 may also be used with a variety of other transportation methods in addition to aircraft of opportunity.

FIG. 2A shows a pallet 100 having track rails 110 mounted flush on the surface of the pallet 100. In various exemplary embodiments of the apparatus and methods according to this invention, the pallet 100 includes a plurality of stanchion attachment points 120 and seat attachment points 130. The stanchion attachment points 120 and seat attachment points 130 are identified with contrasting geometric shapes corresponding to each available configuration of the patient support pallet system allowing quick and easy set-up of the patient support pallet system. According to the invention, a stanchion 210, comprising a vertical column member 220 and a stanchion base bracket 230, is removably attachable to the pallet 100 at stanchion attachment points 120. The stanchion 210 may be removably attached to the pallet 100 by commercially available quick disconnect fittings 160, shown in FIGS. 2B and 2C for example, or other appropriate securing means. Quick disconnect fittings 160 are inserted into the track rails 110 and secured in position by either extending a "plunger" into the track rail and twisting the quick disconnect fitting 160 to secure the stanchion 210 in place. In various exemplary embodiments of the apparatus and methods according to this invention, other positively locking methods may be used to secure the stanchion 210 to the pallet 100.

Figure 3:
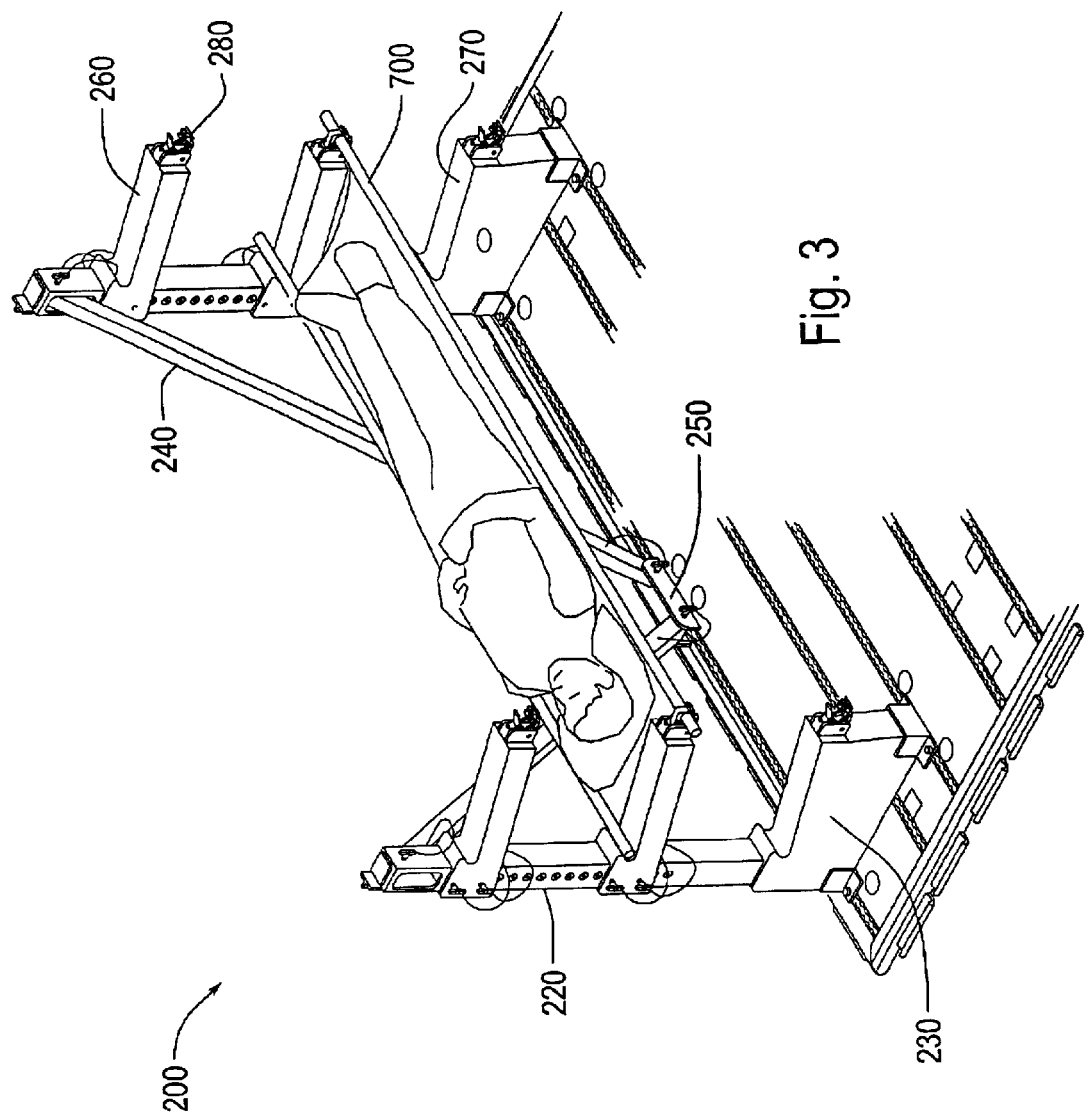
FIG. 3 shows a patient litter secured to a litter stanchion set, according to an exemplary embodiment of the invention.

FIG. 3 shows an assembled litter stanchion set 200 holding a standard folding patient litter 700 and patient, according to an exemplary embodiment of the invention. In FIG. 3, the vertical column member 220 is insertably attached to the stanchion base bracket 230. Two cross members 240 are removably attached to an upper end of the vertical column member 220 and to a cross member base bracket 250. In various exemplary embodiments of the apparatus and methods according to this invention, the cross member base bracket 250 may be secured to the pallet 100 by quick disconnect fittings 160, or other positively locking methods. The assembled litter stanchion set 200 can support up to three NATO standard folding litters 700. The adjustable stanchion arms 260 are vertically adjustable to position two folding litters 700 at a desired height. The adjustable stanchion arms 260 are adjustable to a plurality of positions on vertical column members 220. In one embodiment, the fixed stanchion arms 270 are about 12 inches above the pallet 100 surface. A third folding litter may be disposed on the stanchion base brackets 230 at the fixed stanchion arms 270. In various exemplary embodiments of the apparatus and methods according to this invention, the fixed stanchion arms 270 are integrally attached to the stanchion base brackets 230. In one exemplary embodiment, the vertical separation between the adjustable stanchion arms 260 may be adjusted to a maximum separation of about 22 inches.

The various components of the litter stanchion set 200 maybe constructed of aluminum or other lightweight material, such as a composite or polymer material suitable for the purposes of the invention. In one preferred embodiment, the individual pieces of the litter stanchion set 200 are constructed of aluminum and the seams are welded or sealed to prevent fluid penetration thereby preventing contamination, and reducing cleaning, sterilization and replacement costs. Each of the stanchion arms 260, 270 are fitted with standard litter support brackets 280 to securely hold a folding litter 700.

Figure 9:
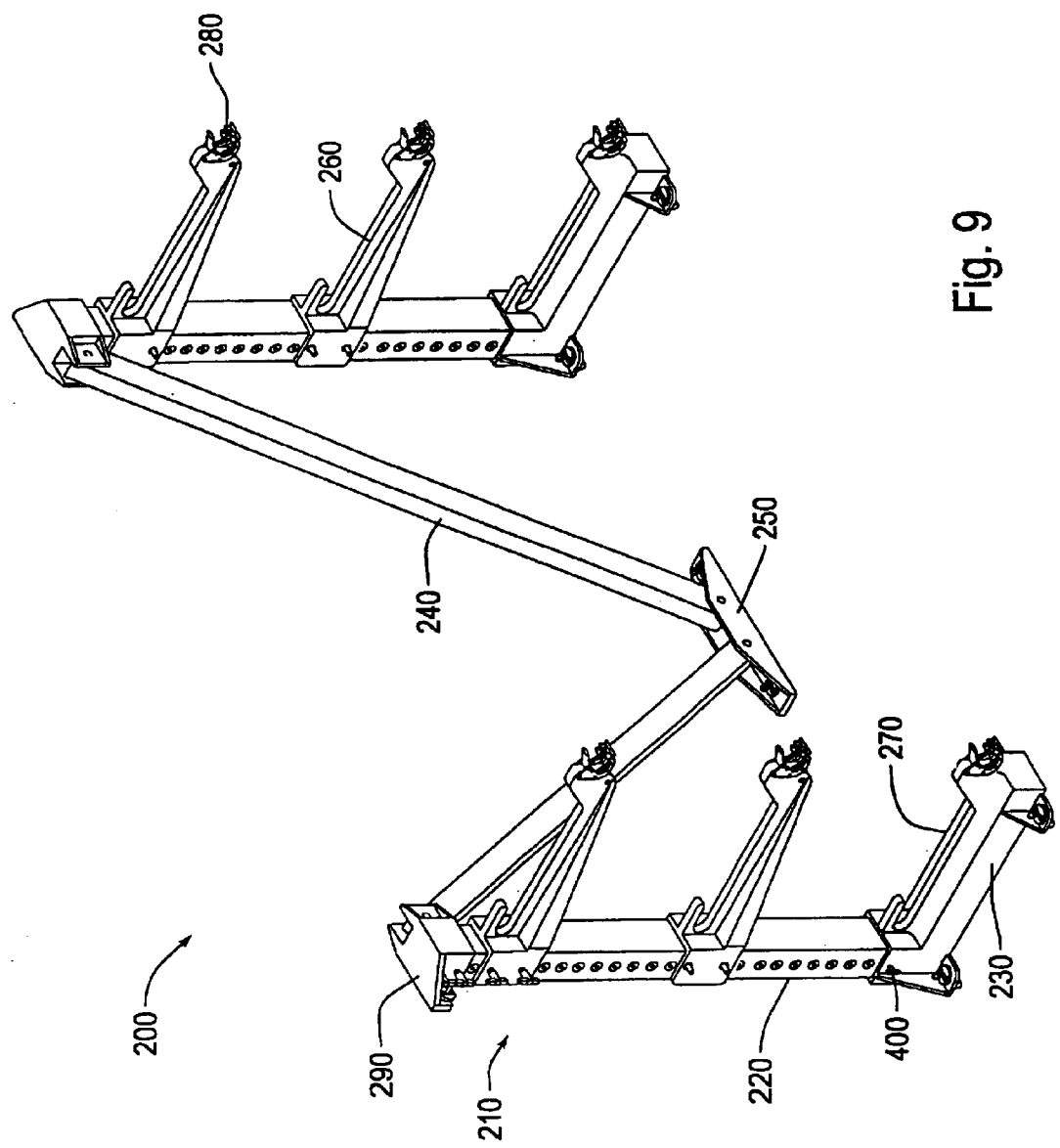
FIG. 9 shows a view of an assembled set of litter stanchions with a tension bar collar, according to an exemplary embodiment of the invention.

FIG. 4 shows one exemplary embodiment of a patient support pallet system for mixed use with airline-type seats 300 and a litter stanchion set 200 capable of supporting up to three tiers of litters 700. In FIG. 4, each litter stanchion base bracket 230 is removably attached to the pallet 100 at litter stanchion attachment points 120 by quick disconnect fittings 160, or other attachment device, connecting the litter stanchion 210 to the pallet 100. In an exemplary embodiment of the invention, the vertical column members 220 are inserted into and affixed to the stanchion base brackets 230 by welding or bolting. In another exemplary embodiment of the invention, the vertical column members are removably inserted into the stanchion base brackets 230 and secured therein by pins 400 or other such securing means (FIG. 9). The two cross members 240 are removably attached to an upper end of respective vertical column members 220 and to a cross member base bracket 250 to secure the vertical column members in an upright vertical position. The cross member base bracket 250 is adjustably affixed to the track rail 110 to provide a point of attachment for the two cross members 240 in the desired configuration. The airline-type seats 300 are removably attached to the pallet 100 at seat attachment points 130. In various exemplary embodiments of the apparatus and methods according to this invention, the airline-type seats may be removably attached to the pallet 100 by quick disconnect fittings 160 or other positively securing methods.

In various exemplary embodiments of the apparatus and methods according to this invention, the assembled litter stanchion 210 is detachably attached together by pins 400, such as standard ball-lock type pins, or other connecting device, to allow quick and easy assembly and disassembly of each of the litter stanchions 210. In one exemplary embodiment, the pins 400 are secured at their proper locations by lanyards 410 to prevent loss of the pins 400 during transportation as well as to allow quick access to the pins during assembly. The adjustable stanchion arms 260 are adjustably secured to the vertical column members 220 by the pins 400 or similar means. The pins 400 pass through the adjustable stanchion arms 260 and the vertical column members 220 securely holding the adjustable stanchion arms 260 in place. The pins 400 may be secured to either the adjustable supporting arms 260 or the vertical column members 220 by a lanyard 410, or other means suitable for securing the pins 400. The two cross members 240 may be similarly affixed by pins 400 to an upper end of respective vertical column members 220 and to the cross member base brackets 250, thereby allowing quick and easy assembly, disassembly and storage of the litter stanchion set 200. The stanchion base brackets 230 may be detachably fixed to the pallet 100 by means of quick disconnect fittings 160, or other attachments device, securely attaching the stanchion base bracket 230 to the pallet 100. The mixed use configuration provides for the transportation of patients as well as attendants and/or passengers. The patient support pallet system is easily reconfigured and may be used for a variety of different aircraft of opportunity or other modes of transportation.

Figure 5:
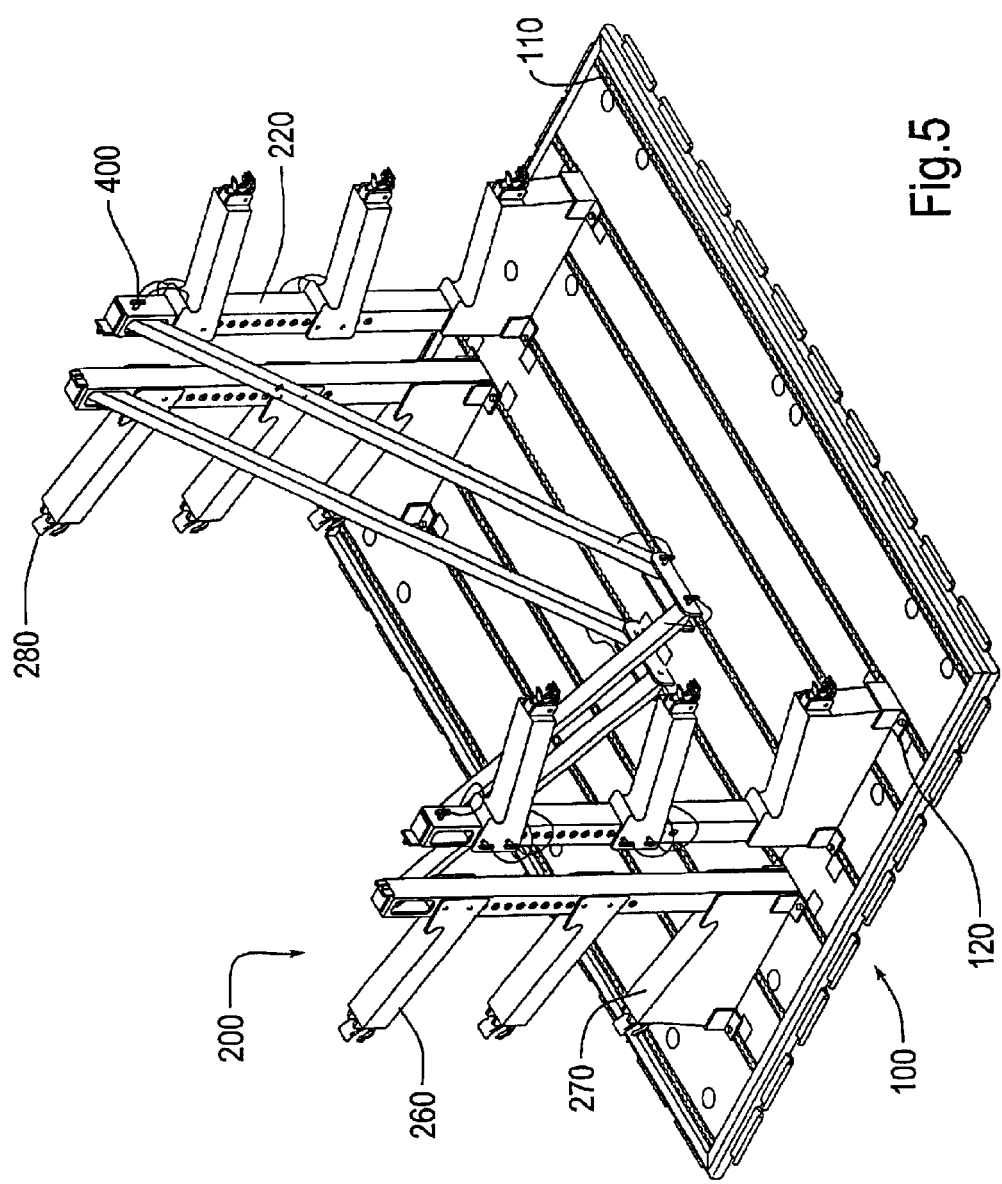
FIG. 5 shows a patient support pallet system having a pallet with two sets of centerline stanchions capable of supporting six patients, according to an exemplary embodiment of the invention.

FIG. 5 shows one exemplary embodiment of a patient support pallet system according to this invention having a litter pallet 100 with two litter stanchion sets 200 detachably fixed to the pallet 100 at litter stanchion attachment points 120 located at track rails 110. The two litter stanchion sets 200 are capable of supporting up to six patients on litters 700. In FIG. 5, the two litter stanchion sets 200 are disposed about center line of the pallet 100 in a direction parallel to the longitudinal axis of the pallet 100. The stanchion arms 260, 270 extend perpendicularly outward from the vertical column members 220 to receive litters 700. The litter stanchion sets may be detachably assembled by the pins 400, as described above. The configuration shown in FIG. 5 keeps patients away from the un-insulated walls of the aircraft and allows for the unobstructed passage of medical personnel or passengers on either side of the two litter stanchion sets 200.

Figure 6:
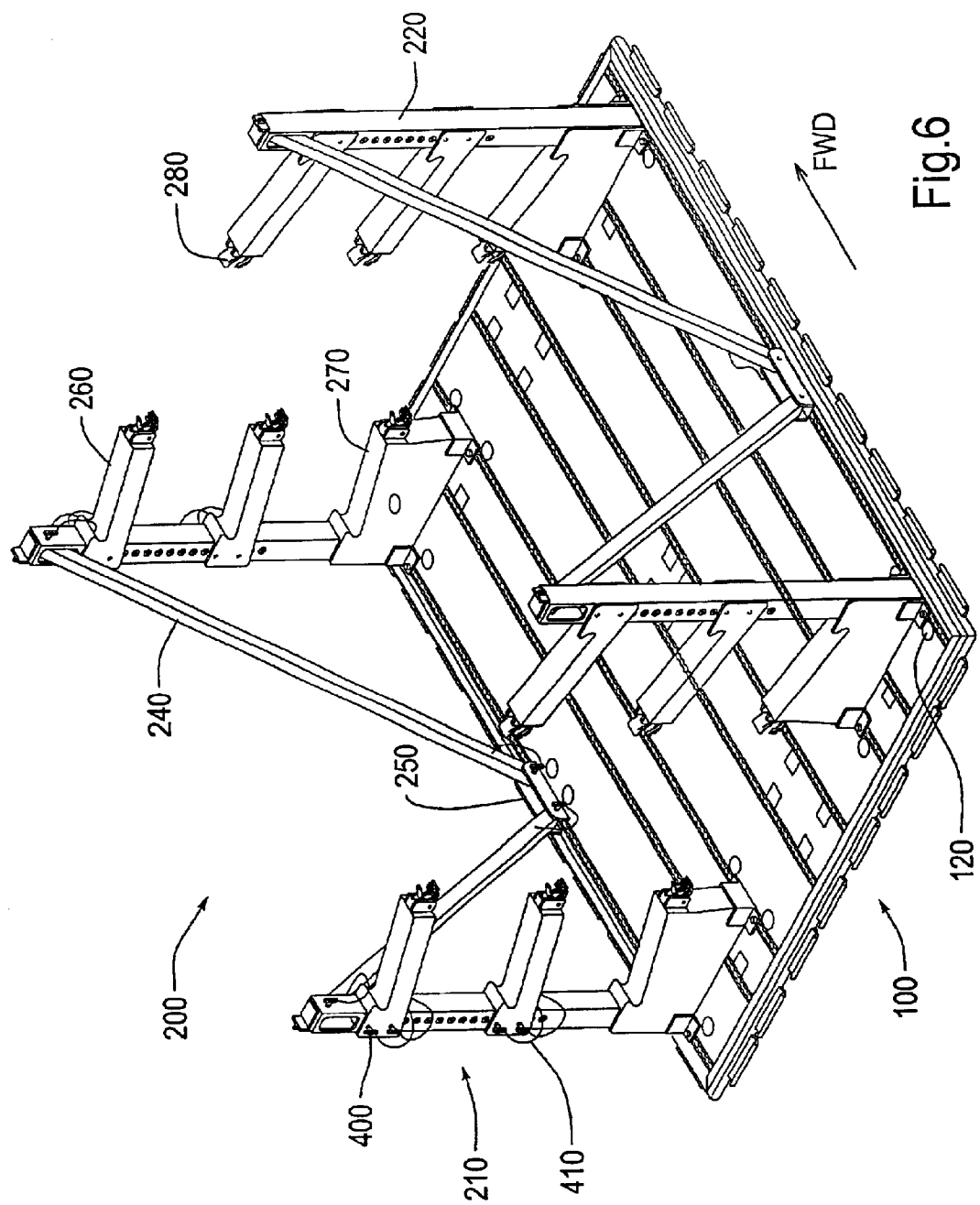
FIG. 6 shows a patient support pallet system including a pallet with two sets of litter stanchions aligned at opposite sides of the pallet capable of supporting three patients on each litter stanchion set, according to an exemplary embodiment of the invention.

FIG. 6 shows one exemplary embodiment of a patient support pallet system according to this invention having a pallet 100 with two litter stanchion sets 200 disposed parallel to each other at opposite sides of the pallet 100 in a direction parallel to the longitudinal axis of the pallet 100. The stanchion arms 260, 270 extend perpendicularly outward from the vertical column members 220 toward the center line of the pallet, thus keeping patients away from the un-insulated walls of the aircraft. The configuration is capable of supporting up to three tiers of patient litters 700 on each litter stanchion set 200 and allows for the unobstructed movement of medical personnel or passengers between the two sets of litter stanchions 200.

Figure 7:
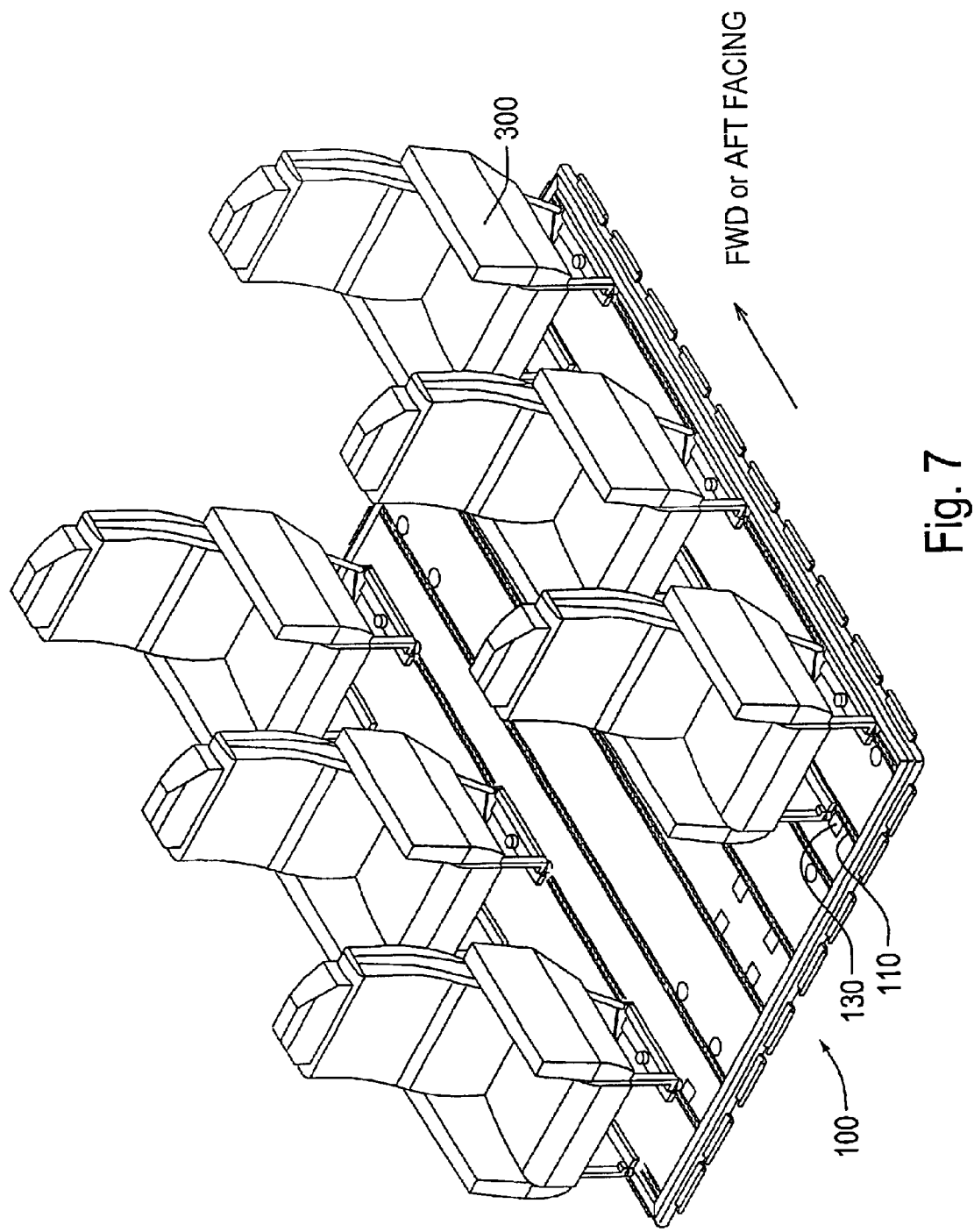
FIG. 7 shows a patient support pallet system having a seating only pallet configuration with six aircraft seats, according to an exemplary embodiment of the invention.

FIG. 7 shows one exemplary embodiment of a patient support pallet system according to this invention having a seating only pallet configuration with six airline-type seats 300 arranged in two rows of three seats disposed on a single pallet 100. The airline-type seats 300 are adjustably attached to the pallet 100 at the track rails 110 corresponding to this configuration by quick disconnect fittings 160, or other attachment device. The airline-type seats 300 are adjustably affixed at track rails 110 at seat attachment points 130. The configuration allows for passenger and/or attendant seating while allowing unobstructed passage between the rows of airline-type seats 300. The airline-type seats 300 may include lap safety belts, in arm bi-fold trays, padded arm rests, adjustable head rests and back rests, a slide down arm (accommodates for large individuals), removable cushions and washable cushion covers.

Figure 8:
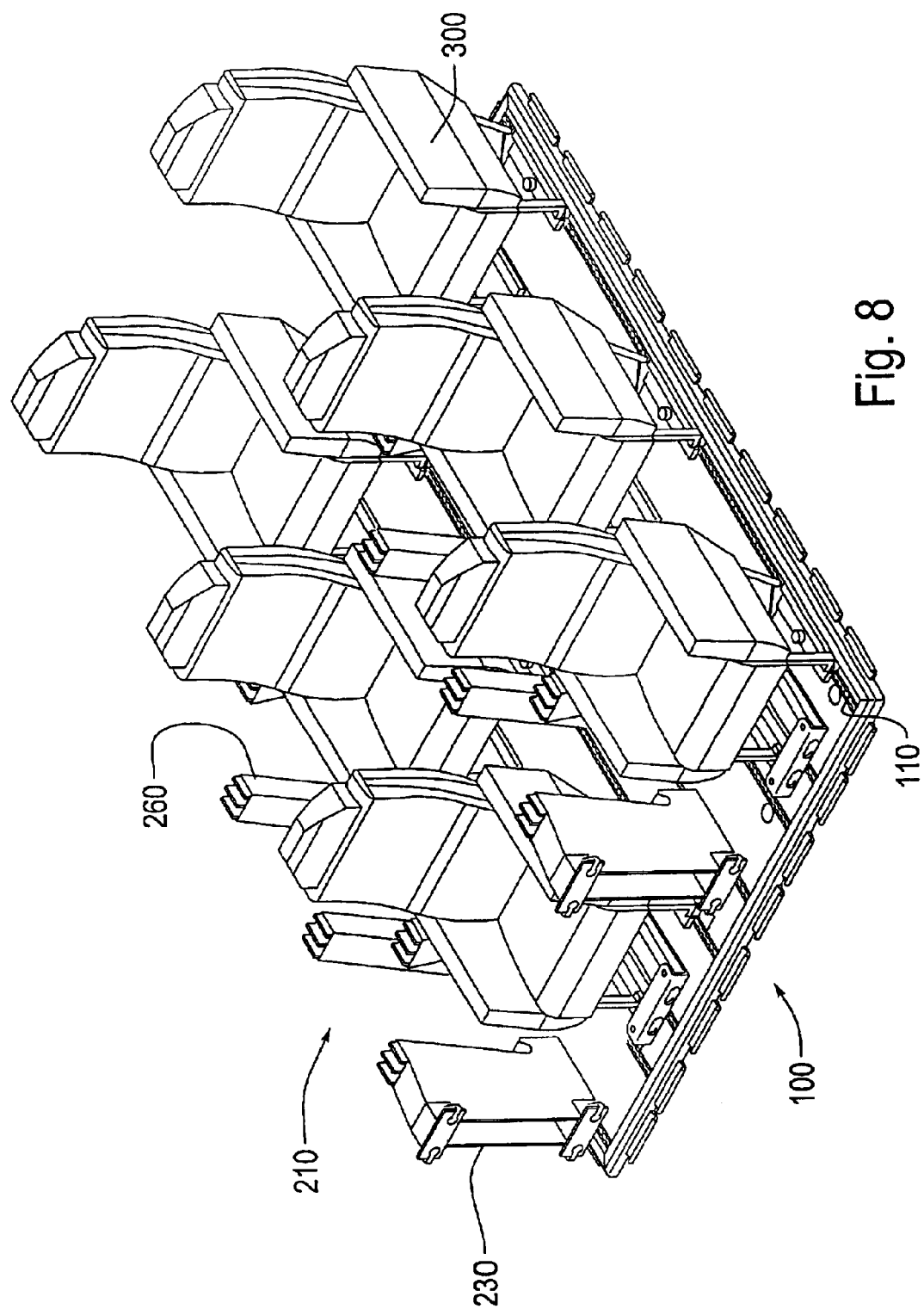
FIG. 8 shows a patient support pallet system with partially disassembled litter stanchions and pairs of passenger seats aligned in rows on a patient support pallet, according to an exemplary embodiment of the invention.

FIG. 8 shows a second exemplary embodiment of a seating only configuration of a patient support pallet system according to the invention. In this configuration the airline-type seats 300 are adjustably attached to pallet 100 by quick disconnect fittings 160, or other attachment device, at corresponding track rails 110 at second set of track rails 110 and seat attachment points 130. This configuration allows for storage and transportation of partially assembled litter stanchions 210 while maintaining passenger seating. In this configuration, the litter stanchions 210 are detached from the pallet 100 and the cross members 240 are removed from the cross member brackets 250. The litter stanchions 210 are positioned horizontally between rows of airline-type seats 300 to minimize their volume during transporting with all pallet configuration hardware materials fitting within the pallet footprint.

Figure 10:
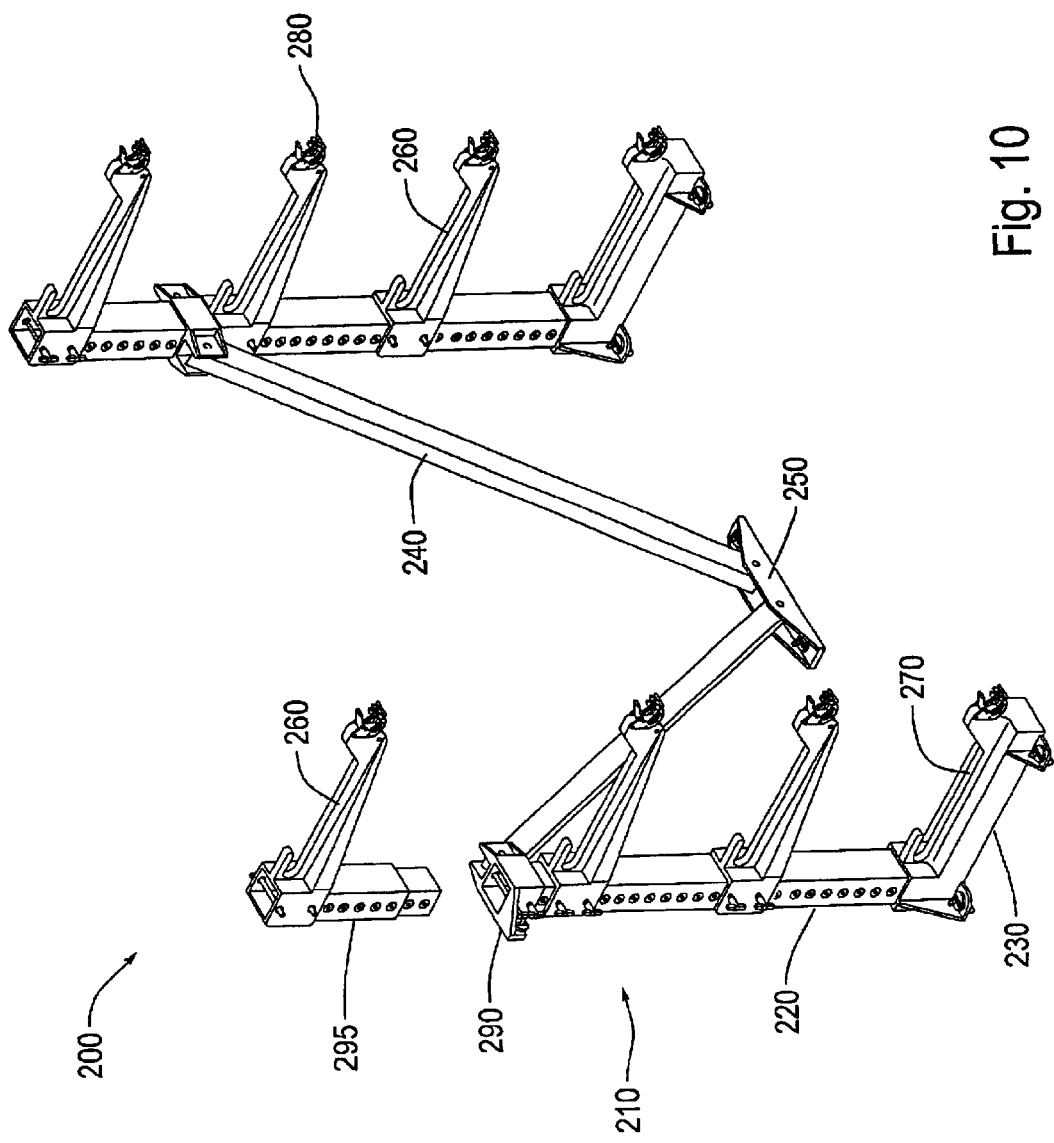
FIG. 10 shows a litter stanchion with a tension bar collar and a removable stanchion extension having a stanchion arm, according to an exemplary embodiment of the invention.

FIGS. 9 and 10 show various exemplary embodiments of a litter stanchion set 200. According to the exemplary embodiment shown in FIG. 9, each vertical column member 220 includes a tension bar collar 290 attached to an upper end of the vertical column member 220. The two cross members 240 are removably attached to the tension bar collars 290 by the pins 400. The pins 400 allow for adjustment of the tension bar collars 290 to their fixed height and lanyards 410 may be used to secure the pins 400 in their proper locations. This embodiment further includes a stanchion base bracket 230 having a height of 6 inches rather than that of the embodiment shown in FIGS. 2–6, for example. An advantage of this embodiment is an increase in the adjustment capabilities of the litter stanchion 210 to provide for a greater amount of adjustable stanchion arm 260 position and use in a wider variety of aircraft of opportunity.

FIG. 10 shows a second exemplary embodiment of the litter stanchion 210 wherein the two cross members 240 are attached to the vertical column members 220 at the tension bar collars 290 by the pins 400. Vertical member extensions 295 are insertably attached to the tension bar collars 290 by the pins 400. Additionally, in this embodiment of the invention, each vertical member extension 295 includes an adjustable stanchion arm 260. The adjustable stanchion arms 260 are removably attached to the vertical member extensions 295 by the pins 400 as in the previously described embodiment. An advantage of this embodiment is an increase in the adjustment capabilities of the litter stanchion 210 to provide for a greater amount of adjustable stanchion arm 260 position and use of the patient support pallet system in a wider variety of aircraft of opportunity, or other mode of transportation.

Figure 11:
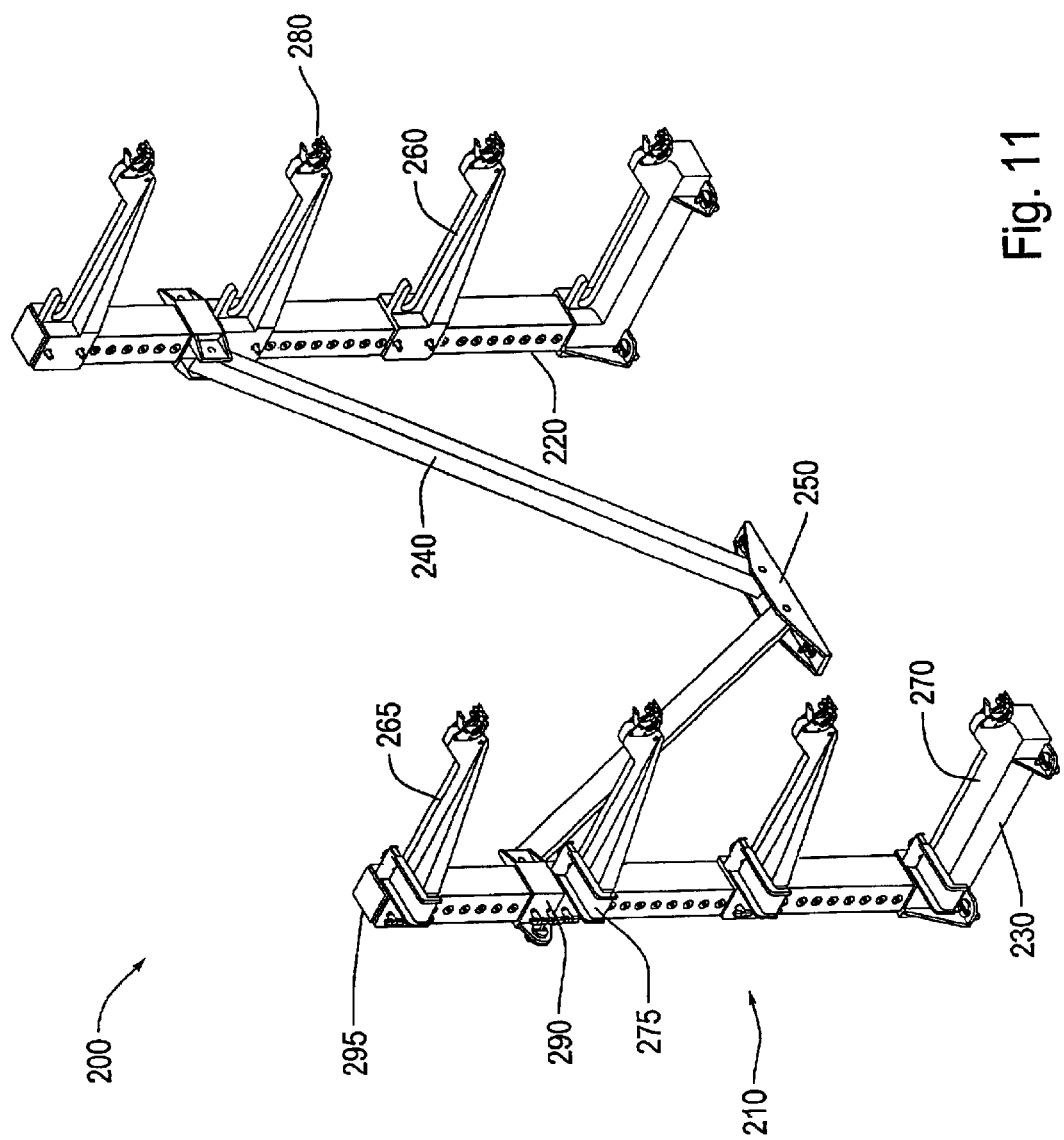
FIG. 11 shows a view of a litter stanchion set having modified adjustable stanchion arms with a litter catch according to an exemplary embodiment of the invention.

FIG. 11 shows another exemplary embodiment of a litter stanchion set 200 having vertical support members 220 attached to their respective stanchion bases 230 and a modified adjustable stanchion arm 265. In this embodiment, the modified adjustable stanchion arm 265 includes a litter catch 275 disposed on the forward side of the adjustable stanchion arm 265 to prevent a litter 700 from sliding forward in the event of a sudden stop or crash. The litter catch 275 is removably attached to the adjustable stanchion arm 265.

Figure 12:
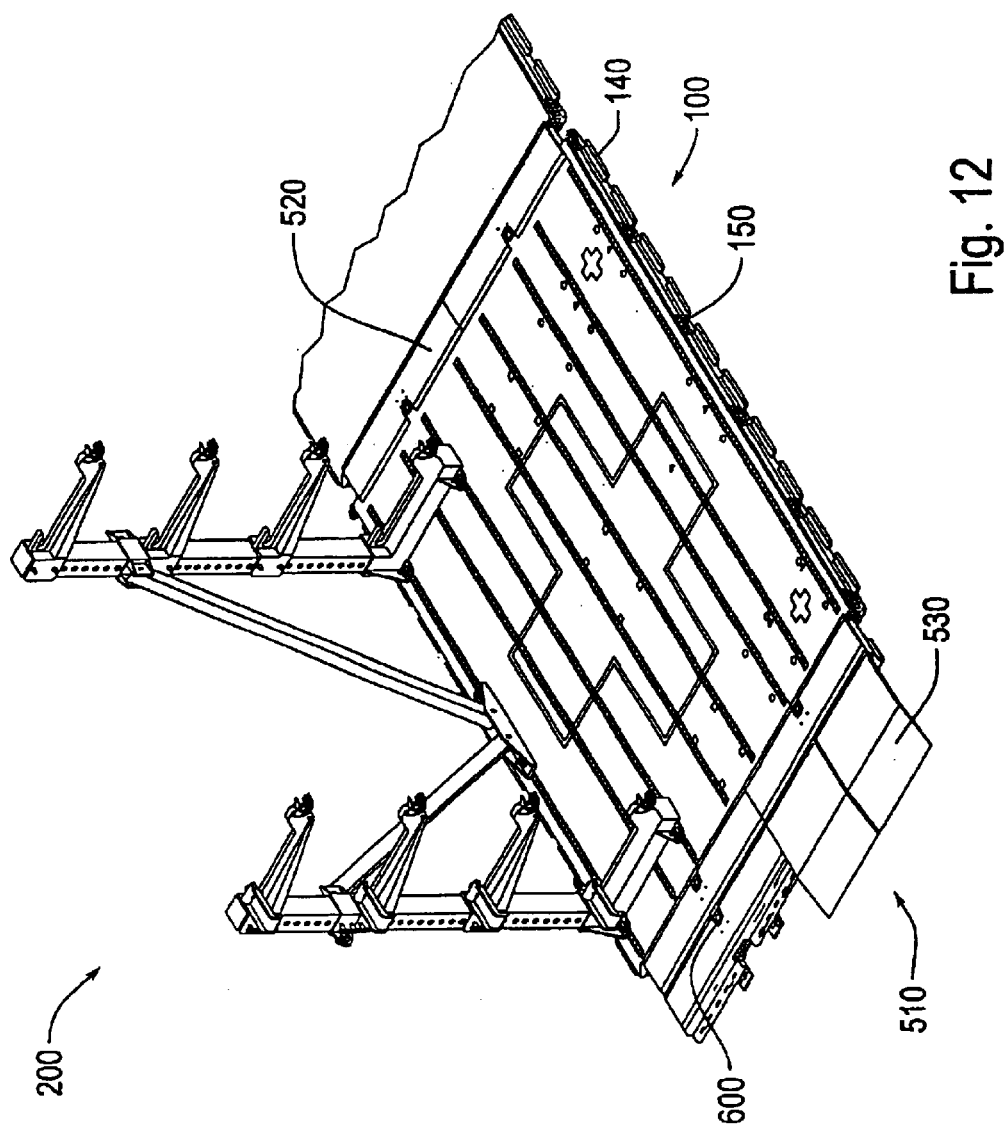
FIG. 12 shows a patient support pallet system with pallet extensions, spacers and ramps, according to an exemplary embodiment of the invention.

FIG. 12 shows an exemplary embodiment of an assembled litter stanchion set 200 attached to a pallet 100 that includes a pallet extension 510, pallet spacer 520 and pallet ramp 530 to facilitate safe passage on, off and between pallets by reducing tripping hazards that are inherent to cargo aircraft, such as pallet roller systems and restraint systems. The pallet extension 510 extends the useable surface of a pallet 100 by attaching to an end or side of the pallet. The pallet extension is removably attachable to the pallet 100 through the use of cargo rings 150 disposed around the periphery of the pallet 100 using a cargo ring hitch 600. The pallet spacer 520 can span the gap between two adjacent pallets 100 or act as a pallet. extension. The pallet spacer 520 is removably attachable to one side of the pallet 100 or a pallet extension 510 with a cargo ring hitch 600. The pallet ramp 530 creates a sloping surface between the floor of an aircraft and the surface of a pallet 100. The pallet ramp 530 is removably attachable to the pallet extension 510 using a plurality of fasteners 530*d* (FIG. 15*b*), such as hand operated quarter turn fasteners, and the like, that are commercially available. The pallet extension 510 includes a plurality of receptacles to secure the pallet ramp 530 at a plurality of positions. Each of the pallet extension 510, pallet spacer 520 and pallet ramp 530 may be constructed from aluminum, aluminum alloy sheet metals, or other appropriate materials.

Figure 13:
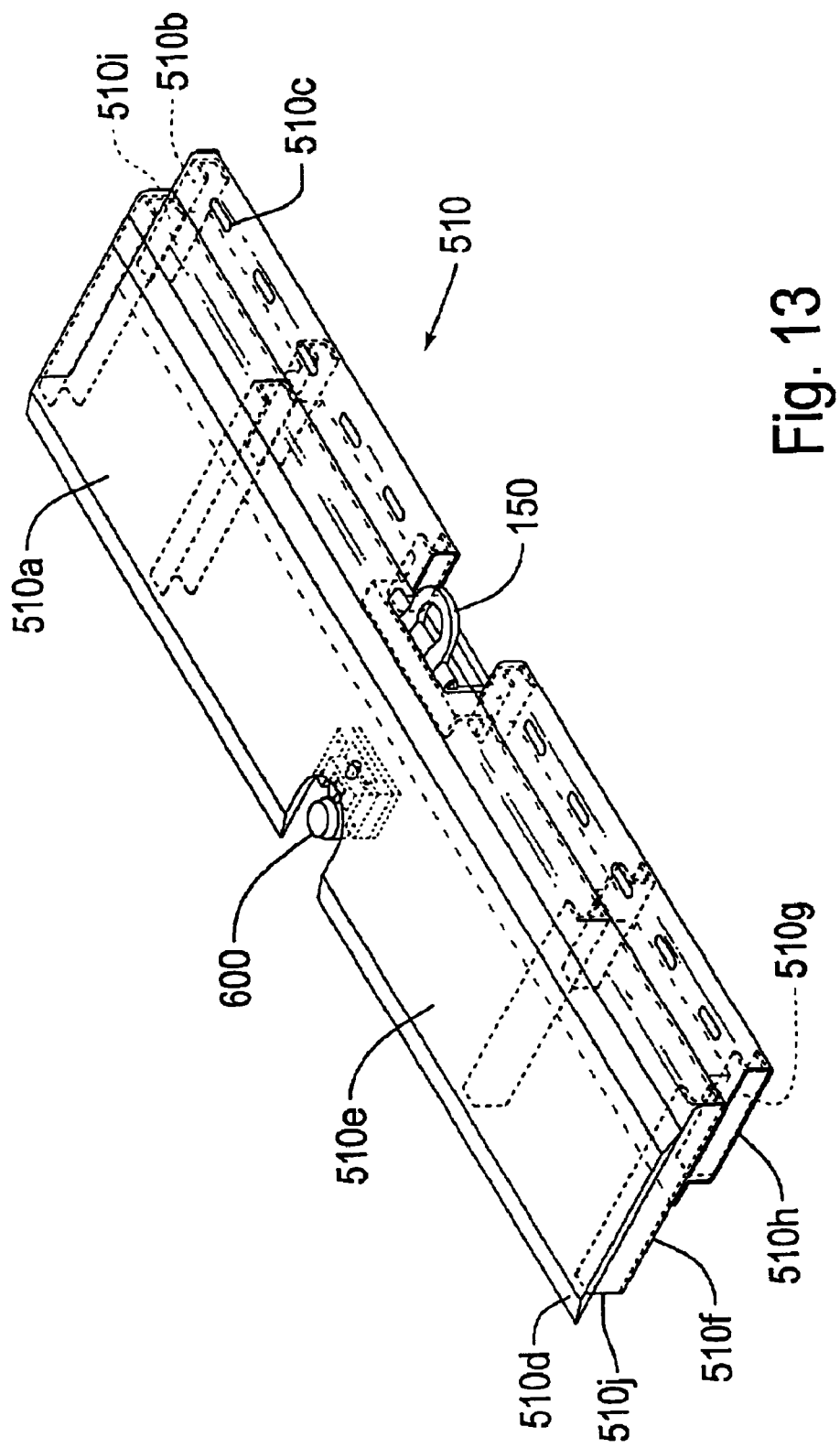
FIG. 13 shows a pallet extension member, according to an exemplary embodiment of the invention.

FIG. 13 shows a pallet extension 510, according to one exemplary embodiment of the invention. The pallet extension 510 has a generally stair shape having an upper stair portion 510*a* and a lower stair portion 510*b* and a riser portion 510*i* disposed there between. The upper stair portion has an upper surface 510*e* and a lower surface 510*f*. The pallet extension 510 includes a cargo ring hitch 600 disposed on the lower surface 510f to secure the pallet extension 510 to the pallet 100 at a cargo ring 150. The lower stair portion 510b has an upper surface 510g and a lower surface 510h. A cargo ring 150 is disposed opposite the cargo ring hitch 600 to receive a pallet extension 510 or a spacer 520. The pallet extension 510 also includes a plurality of fastener receptacles 510c, on the upper surface 510g of the lower step portion 510b to receive fasteners 530d to secure the pallet ramp 530 to the pallet extension 510 at a plurality of positions. In various exemplary embodiments of the apparatus and methods according to this invention, the pallet extension 510 also includes an abutting portion of 510i and a lip portion 510d integral with the upper surface 510e of the upper step portion 510a that overlaps the surface of an abutting pallet 100 when the pallet extension 510 is connected thereto, thereby facilitating safe passage between the surface of the pallet extension 510 and the pallet 100. The cargo ring hitch 600 is disposed below the lip portion 510d to receive a cargo ring 150.

Figure 14:
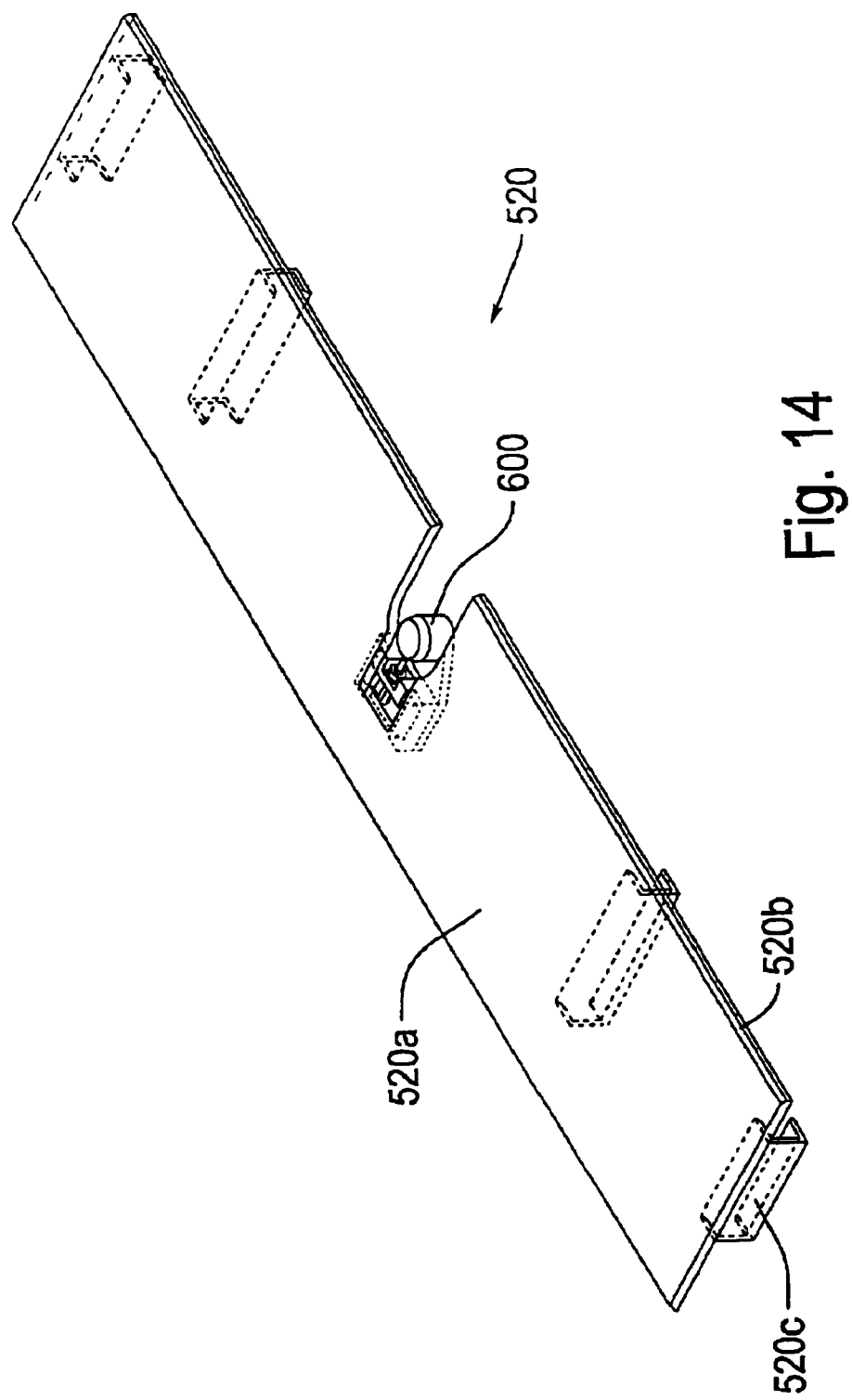
FIG. 14 shows a pallet spacer member, according to an exemplary embodiment of the invention.
Figures 16, 17:
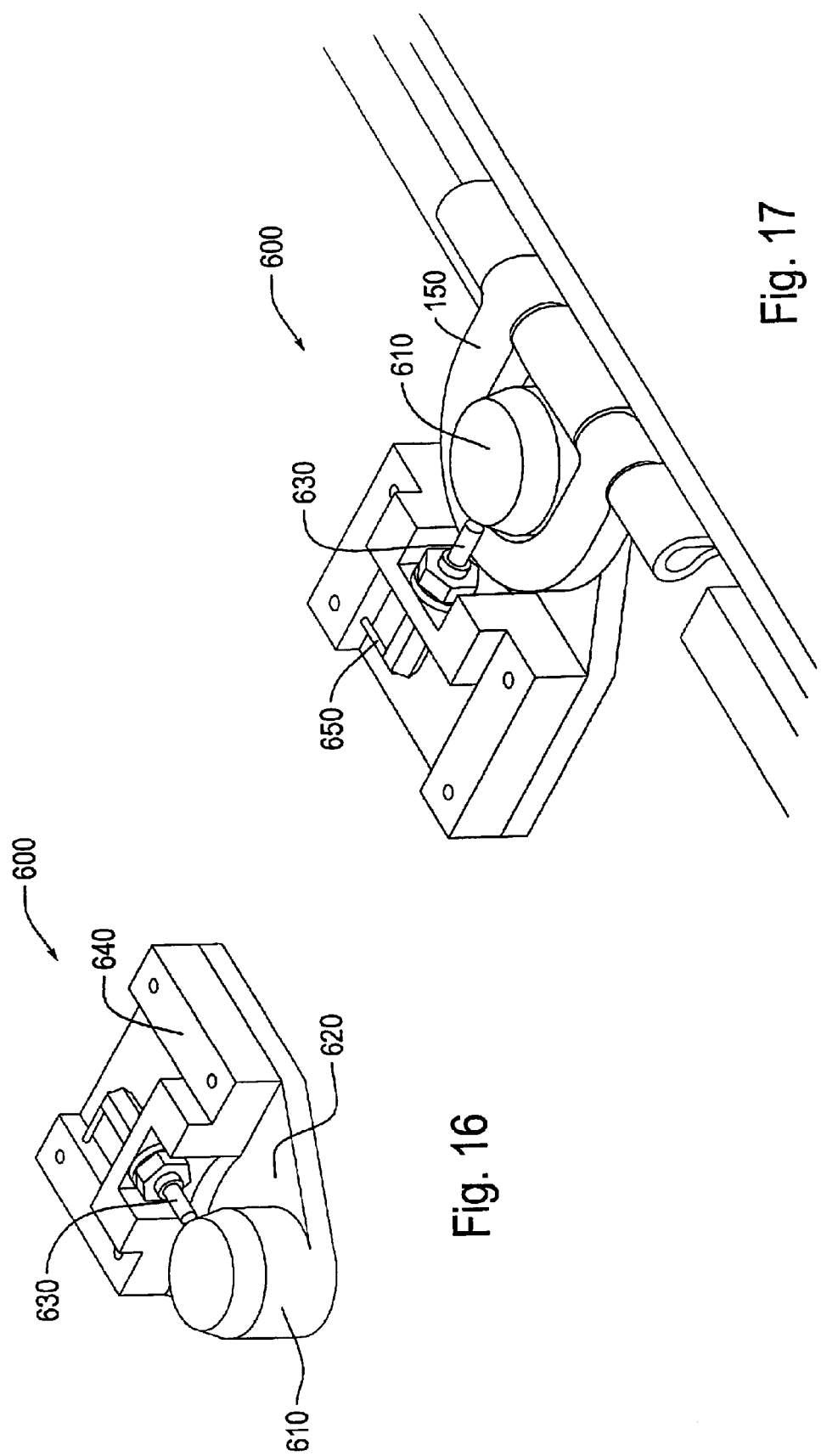
FIG. 16 shows a cargo ring hitch, according to an exemplary embodiment of the invention.
FIG. 17 shows a cargo ring hitch engaged with a cargo ring, according to an exemplary embodiment of the invention.

FIG. 14 shows a pallet spacer 520, according to one exemplary embodiment of this invention. The pallet spacer 520 spans a gap between, and overlaps the surface of, two adjacent pallets 100. The pallet spacer 520 has an upper surface portion 520a and a lower surface portion 520b. The lower surface portion 520b has a plurality of C-shaped channels 520c attached thereto that abut an end surface of each pallet 100 being spanned by the spacer 520. The C-shaped channels 520c rest on pallet lips 140 that provide additional support for the pallet spacer 520. The pallet spacer 520 is removably attachable to a cargo ring 150 of a pallet 100 with a cargo ring hitch 600. In one exemplary embodiment, the cargo ring 150 of the pallet 100 rotates downward over the hitch and is secured thereto, thereby attaching the pallet spacer 520 to the pallet 100 (FIG. 17). The pallet spacer 520 spans the gap between two adjacent pallet 100, thereby facilitating safe passage between pallets.

FIGS. 15a and 15b show one exemplary embodiment of a pallet ramp 530 according to the apparatus and methods of this invention. The pallet ramp 530 includes a ramp portion 530a, a Z-shaped portion 530b and a hinge 530c. The hinge 530c attaches the ramp portion 530a to the Z-shaped portion 530b. The Z-shaped portion 530b also includes a plurality of fasteners 530d for adjustably securing the pallet ramp 530 to a pallet extension 510. The fasteners 530d are received in the fastener receptacles 510c of the pallet extension 510. Accordingly, when the pallet ramp 530 is connected to the pallet extension 510 the pallet ramp 530 creates a sloping surface between the floor of an aircraft, or other mode of transportation, and the surface of the pallet 100 thereby facilitating safe passage between the surface of the pallet 100 and the floor of an aircraft, or other transportation vehicle.

FIG. 16 shows a cargo ring hitch 600, according to the present invention. The cargo ring hitch 600 includes a hitch portion 610 secured to a hitch plate 620. A plunger bracket 640 is also secured to the hitch plate 620. A plunger 630 is insertably secured to the plunger bracket 640 and includes a biasing means, such as a spring (not shown), to urge the plunger 630 against the hitch portion 610, thereby securing a cargo ring 150 to the cargo ring hitch 600 in the space between the plunger 630 and the hitch plate 620.

FIG. 17 shows a cargo ring 150 connected to a cargo ring hitch 600, according to one exemplary embodiment of the invention. The cargo ring 150 is hingeably connected to a pallet 100. The plunger 630 of the cargo ring hitch 600 is withdrawn from the hitch portion 610 by the handle 650, thereby allowing the plunger 630 to disengage from the hitch portion 610. The cargo ring 150 is rotated over the hitch portion 610 of the cargo ring hitch 600. The plunger 630 is then released and the biasing means of the plunger urges the plunger 630 against the hitch portion 610, thereby securing the cargo ring hitch 600 to the cargo ring 150.

While this invention has been described in conjunction with the exemplary embodiments outlined above, it is evident that many alternatives, modifications and variations will be apparent to those skilled in the art. Furthermore, although the exemplary embodiments are described for use in a variety of aircraft, it is contemplated that this invention may be used with other methods of transportation. The invention may also be used in the field as a "stand-alone" system to enable more efficient use of space intended for use with patient litters. For example, the patient support pallet system may be used in a tent to more efficiently house patients. Accordingly, the exemplary embodiments of the invention, as set forth above, are intended to be illustrative, not limiting. Various changes may be made to the invention without departing from the spirit and scope thereof.

What is claimed is:

1. A reconfigurable patient support pallet system, for use in a vehicle, comprising:
    a pallet selectively detachably mountable on a floor of a compartment of the vehicle, the pallet having a floor surface spaced above the floor of the vehicle, a plurality of spaced apart track rails and a plurality of attachment points disposed on the surface of the pallet; and
    at least one rigid litter stanchion set detachably attached to the pallet along a pair of said track rails at a first plurality of the attachment points and at least one seat attached to the pallet along another pair of said track rails at a second plurality of the attachment points, wherein the attachment points for the rigid litter stanchion set and the seat are differentiated by respective geometric shapes.

2. A reconfigurable patient support pallet system, for use in a vehicle, comprising:
    a pallet selectively detachably mountable on a floor of a compartment of the vehicle, the pallet having a floor surface spaced above the floor of the vehicle, a plurality of spaced apart track rails and a plurality of attachment points disposed on the surface of the pallet; and
    at least one rigid litter stanchion set detachably attached to the pallet along a pair of said track rails at a first plurality of the attachment points and at least one seat attached to the pallet along another part of said track rails at a second plurality of the attachment points, wherein the rigid litter stanchion set comprises:
    first and second column members insertably attachable to first and second stanchion base brackets, each of the stanchion base brackets being attachable to the pallet at a plurality of the attachment points;
    at least one vertically adjustable stanchion arm attachable to each of the first and second column members; and
    two cross-members attachable to the column members at a first end and attachable to a cross-member base bracket at a second end, the cross-member base bracket being attachable to the pallet at a plurality of the attachment points.

3. The patient support pallet system according to claim 2, wherein each of the stanchion base brackets includes a fixed stanchion arm formed integrally with each of the stanchion base brackets.

4. The patient support pallet system according to claim 2, wherein each of the column members further comprises a column member extension insertably attachable into an upper end opening of each of the column members.

5. The patient support pallet system according to claim 4, wherein each of the column member extensions includes one said adjustable stanchion arm.

6. The patient support pallet system according to claim 2, wherein
the column members are secured to the stanchion base brackets by at least one pin inserted through the stanchion base bracket and the column member;
the at least one adjustable stanchion arm is secured to the column members by at least one pin inserted through the adjustable stanchion arm and the column member; and
the two cross-members are removably attached to each of the column members at the first end, by at least one pin inserted through the cross member and the column member, and removably attachable to the cross-member base bracket at a second end by at least one pin inserted through the cross member and the cross member base bracket.

7. The patient support pallet system according to claim 6, wherein the pins are secured proximate to respective insertion points by lanyards.

8. The patient support pallet system according to claim 2, wherein the column members are permanently affixed or assembled with bolts to the stanchion base brackets.

9. The patient support pallet system, according to claim 2, wherein the at least one litter stanchion set is configured on a side of the pallet opposite to the at least one seat, in a direction parallel to a longitudinal axis of the pallet.

10. The patient support pallet system according to claim 2, wherein the system includes two said rigid litter stanchion sets attachable to the pallet, configured at opposite sides of the pallet in a direction parallel to a longitudinal axis of the pallet, the rigid litter stanchion sets include the at least one stanchion arm extending from the column members toward a centerline of the pallet.

11. The patient support pallet system according to claim 2, wherein the system includes two said rigid litter stanchion sets attachable to the pallet, configured in the center of the pallet in a direction parallel to a longitudinal axis of the pallet, the rigid litter stanchion sets include the at least one stanchion arm extending from the column members and toward opposite sides of the pallet.

12. The patient support pallet system according to claim 3, wherein the at least one stanchion arm includes a catch removably attached on a forward side of the stanchion arms to prevent a litter from sliding forward in the event of a sudden stop or crash.

13. The patient support pallet system according to claim 2, further comprising:
a pallet extension member attachable to any side of the pallet for increasing a surface area of the floor surface of the pallet.

14. The patient support pallet system according to claim 13, wherein the pallet extension member has a cross-sectional stair shape, comprising:
an upper stair portion, a lower stair portion, and a first face disposed between the upper stair portion and the lower stair portion; and
a second face, disposed opposite the first face, extending downwardly from the upper stair portion, wherein a surface of the upper stair portion extends beyond the second face thereby overlapping the pallet.

15. The patient support pallet system according to claim 14, wherein the pallet includes a plurality of cargo rings located on a peripheral side wall of the pallet; and
wherein the pallet extension member further includes:
a cargo ring hitch attached to the upper stair portion for attachment to one of the cargo rings on the pallet; and
an additional cargo ring disposed on the first face above the lower stair portion.

16. The patient support pallet system according to claim 13, further comprising:
a ramp member attachable to the pallet extension member to create a sloping surface between a floor of the vehicle and the floor surface of the pallet.

17. The patient support pallet system according to claim 2, further comprising:
a pallet spacer member attachable to a side of the pallet adjacent another pallet for spanning a gap between the pallet and the adjacent pallet.

18. The patient support pallet system according to claim 17, wherein the pallet includes a plurality of cargo rings located on a peripheral side wall of the pallet; and
wherein the pallet spacer member includes:
a cargo ring hitch to detachably attach the pallet spacer to one of the cargo rings on the pallet.

19. The patient support pallet system according to claim 16, wherein the ramp member, comprises:
a support surface;
a bracket having an upper horizontal portion, a lower horizontal portion disposed below the upper horizontal portion, and a vertical portion disposed between the upper and lower horizontal portions, wherein the horizontal portions extend in opposite directions from the vertical portion; and
a hinge portion hingably connected between the vertical portion of the bracket and the support surface, wherein the support surface pivots relative to the pallet and extends between the pallet and the floor of the vehicle to create the sloping surface between the floor and the pallet.

20. The patient support pallet system according to claim 19, wherein the bracket further includes at least one fastener disposed through the lower horizontal portion and detachably attaches to the pallet extension member.

* * * * *